ABSTRACT

United States Patent [19]

Witschard

[11] 3,970,612

[45] July 20, 1976

[54] PROCESS FOR MOLECULAR WEIGHT LOWERING OF POLYVINYL HALIDES

[75] Inventor: Gilbert Witschard, Grand Island, N.Y.

[73] Assignee: Hooker Chemicals & Plastics Corporation, Niagara Falls, N.Y.

[22] Filed: Dec. 30, 1974

[21] Appl. No.: 537,518

[52] U.S. Cl. ................................. 526/86; 526/88; 526/192; 526/218; 526/334; 526/335
[51] Int. Cl.² .................. C08F 2/02; C08F 2/40; C08F 14/06; C08F 259/04
[58] Field of Search ............... 260/92.8 R, 92.8 A, 260/878 R

[56] References Cited
UNITED STATES PATENTS

| | | | |
|---|---|---|---|
| 3,562,237 | 2/1971 | Thomas | 260/92.8 R |
| 3,627,718 | 12/1971 | Seifert et al. | 260/92.8 R |
| 3,862,066 | 1/1975 | Reiter et al. | 260/92.8 A |

*Primary Examiner*—Alan Holler
*Attorney, Agent, or Firm*—Peter F. Casella; James F. Mudd; David A. Stein

[57] ABSTRACT

Vinyl halide homopolymers, copolymers and graft polymers of substantially lower molecular weight are obtained when polymerization is carried out in the presence of an organotin mercaptide ester and an organic azo initiator. The products are faster fusing and have lower melt viscosities than corresponding polymers of the same molecular weight prepared by high temperature molecular weight reduction methods. The low molecular weight and excellent fusion characteristics of the products render these polymers particularly useful in molding, extrusion, and coating applications.

13 Claims, No Drawings

PROCESS FOR MOLECULAR WEIGHT LOWERING OF POLYVINYL HALIDES

BACKGROUND OF THE INVENTION

1. Field of the Invention

This invention relates to an improved method of regulating polymer molecular weight in the preparation of homopolymers, copolymers and graft polymers of vinyl halides such as vinyl chloride, in which polymerization is carried out in the presence of an organotin mercaptide without the necessity of raising the polymerization temperature to obtain low molecular weight polymer.

2. Description of the Prior Art

The tendency of certain free radical polymerizable materials such as the vinyl halides to polymerize to relatively high molecular weight polymers under normal polymerization conditions is well known. These high molecular weight polymer products have relatively high melt viscosities so that they are generally processed with difficulty in processing procedures which require fusion of the polymer and handling of the molten polymer. Frequently the melt visocity of the polymer is so high as to require use of extremely high temperatures to obtain flowable or extrudable melts and such high processing temperatures can have a detrimental effect on the strength and color of the polymer.

Various techniques have been proposed for regulating the molecular weight of such polymers, i.e., for preparing polymers of lower molecular weight and, hence, lower melt viscosities. One such technique involves raising the temperature of the polymerization, but this procedure involves the danger of a "runaway" i.e., excessively violent, polymerization. Even when this danger can be avoided, e.g., by the inconvenient change of the free radical initiator for the polymerization, the high temperature molecular weight lowering technique provides polymers of undesirable long fusion time and/or high melt viscosities. Alternatively it is known to prepare the polymers of lower molecular weight by carrying out the polymerization in the presence of halogenated hydrocarbons such as perchloroethylene, chloroform, bromoform, ethylene dibromide and the like, or mercaptans such as alkyl mercaptans. However, many of these known molecular weight regulating agents require elevated polymerization temperatures which are nearly as great or as great as those of the elevated temperature regulating procedure described above. Additionally these agents are relatively volatile, importing unpleasant or even intolerably noxious odors to the polymer or the work area wherein the polymer is prepared or processed.

According to U.S. Pat. No. 3,272,786, to Perry, polymerization of an ethylenically unsaturated monomer, such as vinyl halide, in the presence of tin organo metallic compound wherein all of the organic substituents are attached to the metal by metal to carbon covalent bonds, for example tetraalkyl tin, e.g. tetraethyl tin, is effective in producing lower molecular weight polymer. However the reference compounds, which do not contain any sulfur, are of a structural type which is relatively volatile and in addition frequently toxic. Thus use of the reference molecular weight regulators in producing low molecular weight polyvinyl halide could readily produce toxicity problems in the work areas where the polymer is prepared and processed.

SUMMARY OF THE INVENTION

According to the invention the disadvantages associated with prior art polyvinyl halide molecular weight regulating techniques and agents are overcome by an improvement in the preparation of a vinyl halide homopolymer vinyl halide copolymer or vinyl halide graft polymer containing up to about 50% by weight of comonomer and/or a compatible back bone polymer by polymerizing in liquid phase vinyl halide monomer or vinyl halide monomer in the presence of up to about 50% by weight of said comonomer and/or said back bone polymer and recovering said vinyl halide polymer from said monomer or monomers. This novel improvement comprises carrying out at least part of the polymerization in the presence of a molecular weight lowering amount of an organotin mercaptide of the formula:

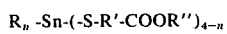

$$R_n\text{-Sn-}(\text{-S-R}'\text{-COOR}'')_{4-n}$$

wherein $n$ is an integer 1 to 3, R and R'' are univalent organic radicals selected independently from the group consisting of alkyl, aryl, alkaryl and aralkyl radicals, and R' is a divalent organic radical selected from the group consisting of alkylene and aralkylene radicals, with the polymerization being initiated by an initiating amount of an organic azo initiator for the reaction.

Use of the present molecular weight lowering agent provides vinyl halide polymers having substantially lower number average molecular weights ($M_n$) and weight average molecular weights ($M_w$) than those of the corresponding polymers prepared at the same temperature in the absence of the present molecular weight lowering agent and azo initiator. Generally, in this regard, use of the present improved process generally effects about a 10 – 40% lowering in number average polymer molecular weight and about a 25 to 45% lowering of weight average polymer molecular weight as compared to the corresponding polymerization carried out at the same polymerization temperature without the novel improvement of the invention. In general the molecular weight reduction achieved by the present invention at a given polymerization temperature is comparable to the molecular weight lowering effect achieved by carrying out conventional polymerization at a temperature 10° to 12°C or more above said given polymerization temperature. It was highly surprising to discover that the present organotin mercaptide esters were effective molecular weight lowering agents in the polymerization of vinyl halides in as much as the prior art has prescribed the addition of these reagents to completely polymerized vinyl halide to stabilize the polymers against thermal decomposition, in other word, against heat-induced degradation of the polymer (see F. Chevassus and R. DeBoutelles, "The Stabilization of Polyvinyl Chloride," E. Arnold Ltd, London, Second Edition, 1963 p. 124–5). The present molecular weight regulating agents are of low volatility and hence avoid odor and toxicity problems associated with prior art molecular weight lowering agents.

Vinyl halide polymerization in the presence of the organic tin compounds of the invention has been found to be effective only in the presence of an organic azo initiator for the polymerization. Thus, when polymerization is carried out in accordance with the procedure of the invention replacing the azo initiator with a corresponding amount of a conventional organic peroxide initiator having substantially similar initiating activity as the azo initiator, substantially little or no polymer is obtained, i.e. the yield of polymer is less than about 5% (see Example 7 below).

DETAILED DESCRIPTION OF THE INVENTION AND PREFERRED EMBODIMENTS THEREOF

The present invention is preferably directed to preparation of vinyl halide homopolymers, copolymers, and graft polymers employing vinyl chloride as the vinyl halide. Preferably the invention contemplates bulk polymerization of vinyl chloride carried out in a single reaction stage, or if desired, a multi-stage, e.g. a two-stage, reaction configuration. The organotin molecular weight regulating agent and the organic azo initiator can be present throughout the polymerization or, if desired, introduced after the monomer or monomers have partially polymerized. When a twostage bulk polymerization is desired, it is particularly advantageous to employ a two-stage polymerization in which during the first stage about 3 to about 15%, preferably about 7 to about 12%, by weight of the monomer or monomers are converted to polymer using high speed agitation followed by completion of polymerization (corresponding to conversion of about 30–85% of the reaction mixture to polymer) at low speed agitation. This especially desirable two-stage bulk polymerization technique is more particularly described in British Pat. No. 1,047,489 and U.S. Pat. No. 3,522,227, to Thomas, the pertinent technology of which patents is incorporated herein by reference. When two-stage polymerization is employed, the organotin molecular weight lowering agent and the organic azo initiator are preferably charged at the beginning of the second reaction stage.

The amount of organo tin mercaptide employed in the polymerization to achieve appreciable molecular weight lowering of the polymer product can be as small as about 0.001% based on weight of the polymerization reaction mixture. While amounts of organotin mercaptide greater than about 5% based on the weight of the polymerization reaction mass are effective, use of such amounts may produce too great a reduction of molecular weight and, hence be undesirable. Preferably the present molecular molecular weight regulating agent is charged to the polymerization reaction mixture in a concentration of about 0.01 to about 2 weight percent, especially about 0.1 to about 1 weight percent.

Generally increasing the concentration of the molecular weight regulator in the polymerization within the above described concentration ranges at a given polymerization temperature increases the molecular lowering effect of the present process.

The amount of organic azo initiator which is required to initiate polymerization in the presence of the organo tin mercaptide ester in accordance with the invention will normally be quite small, say about 0.01 to about 3% based on weight of the polymerization reaction mixture. Preferably the amount of organic azo initation used is about 0.05 to about 2% especially about 0.1 to about 1% based on weight of the polymerization reaction mixture.

The compounds which have been found effective in lowering polymer molecular weight in accordance with the invention are organotin mercaptide esters as defined in the general structure formula above. Generally, the substituents groups R, R′, and R″, contain 1 to 25 carbon atoms and may be straight chained, branched or cyclic radicals including radicals containing conventional inert substituents such as either groups i.e. lower alkoxy substituents, ester substituents (in addition to the ester substituent shown in the formula).

Representative examples of suitable organotin mercaptide esters for use in the invention include the following typical compounds: dibutytin S,S′-bis(3,5,5-trimethyl hexyl-mercaptoacetate), dibutyltin S,S′-bis(-cyclohexyl mercaptoacetate), dibutyltin S,S′-bis(-phenoxyethyl mercaptoacetate), dibutyltin S,S′-bis(-dihydroabietyl mercaptoacetate), dibutyltin S,S′-bis(-trimethyl nonyl mercaptoacetate), dibutyltin S,S′-bis(-diethylene glycol laurate mercaptoacetate), dibutyltin S,S′-bis(2-butyloctylbeta mercaptopropionate), dibutyltin S,S′-bis(n-butylmercaptoacetate), tri(n-butyl)tin S-(n-decyl mercaptoacetate), tri(i-butyl)tin S-(isodecyl mercaptoacetate), triphenyl tin S-(n-decyl mercaptoacetate), tri(p-tolyl)tin S,-(isodecyl mercaptoacetate), dibutyl tin S,S′-bis(dimethyl thiomalate), di(isopropyl)tin S,S′-bis(phenylmethyl beta mercaptopropionate), methyl, ethyl tin S,S′-bis(trimethyl hexyl beta mercaptobutyrate), di(n-butyl)tin S,S′-bis(ethyl alphamercapto-alpha caproate), di(abietyl)tin S,S′-bis(-butyl alpha mercaptopelargonate), di(cyclohexyl)tin S,S′-bis(phenyl mercaptoacetate), dibutyl tin S,S′-bis(5-mercaptovalerate), dibutyl tin S,S′-bis(6-mercaptocaproate), dibutyl tin S,S′-bis(trimethyl hexyl mercaptoacetate), dibutyl tin S,S′-bis(n-butyl phenyl mercaptoacetate), di(cyclohexyl)tin S,S′-bis(n-butyl 12-mercapto laurate), triethyl tin S-(ethyl mercaptoacetate), triethyl tin S(2-methyl tetracosyl mercaptoacetate), n-butyl tin S,S′,S″-tris(ethyl mercaptoacetate) cyclohexyl tin S,S′,S″-tris(phenyl mercaptoacetate), di-n-octyl tin S,S′-bis(isooctylmercaptoacetate), di-n-octyl tin S,S′-bis(isooctylmercaptoacetate), di-isooctyl tin S,S′-bis(isooctylmercaptoacetate), di-(n-dodecyl)-tin S,S′-bis(n-dodecyl alpha-mercaptotridecanoate), methyl tin S,S′,S″-tris(methyl mercaptoacetate), di-(n-dodecyl)tin S,S′-bis(n-dodecyl mercaptoacetate), di(n-butyl)tin S,S′-bis(2-ethyl hexylmercaptoacetate).

Mixtures of these and equivalent isomeric or homologous organotin mercaptide esters can be used in the practice of the invention.

The present organotin mercaptide esters wherein $n$ is 1 in the above general structural formula can be prepared by reacting a stannoic acid with an ester having a mercapto substituent on the acid residue employing a 1:3 molar ratio of tin compound to sulfur containing reactant. Organotin mercaptide esters of the invention wherein $n$ is 2 in accord with the above general structural formula can be prepared by reacting an organo tin oxide with the mercapto-ester employing a 1:2 molar ratio of tin compound to sulfur-containing reactant. Organotin mercaptide esters of the invention wherein $n$ is 3 in accord with the above general structural formula can be prepared by reacting equimolar proportions of a triorganostannic chloride with the mercapto-ester. These methods of preparation are more particularly decribed in E. L. Weinberg and E. W. Johnson, U.S. Pat. No. 2,648,650 and 2,832,750, the pertinent technology of which are incorporated herein by reference.

Preferably the organotin mercaptide ester employed as molecular weight lowering agent in the invention is one corresponding to the above structural formula wherein $n$ is 2. Preferably, also, R,R′,R″ represent straight or branched chain saturated aliphatic radicals, especially radicals containing 1 to 20 carbon atoms, more preferably 1 to 12 carbon atoms. A particularly good result is obtained when the R' group of the organotin mercaptide ester is a straight-chain lower alkylene radical, i.e. as alkylene radical of 1 to 8 carbon atoms, e.g. a methylene group as in the mercaptoacetate group.

Preferably the sulfur or sulfur atoms of the organotin mercaptide ester are attached to the carbon atom of the ester groups which is alpha to the ester carbonyl group, i.e. is attached to the carbon atom of R' in the above structural formula which is adjacent to the ester carbonyl group.

The organic azo compounds which are employed to initiate polymerization according to the invention are numbers of a well known class of organic compounds containing an azo group, $-N_2-$, or $-N_3-$ which on heating undergo homolytic fission and hence are frequently employed in the art to initiate free radical polymerizations. Representative examples of suitable organic azo initiators for use in the invention include the following typical compounds: 2-cyano-2-propyl-azoformamide, 2,2'-azo-bis-isobutyronitrile, 2-(t-butylazo)isobutyronitrile, 2-t-butyl-azo-2-thiocyanate-propane, 1,1'-azo-bis-1-cyclobutane-nitrile, 2,2'-azo-bis-2-methylbutyronitrile, 4-t-butylazo-cyanovaleric acid, 1-cyano-1-(tributylazo)cyclohexane, 2-t-butylazo-2-cyano-4-methyl pentane, 4,4'-azo-bis-4-cyanopentanoic acid, 1,1'-azo-bis-1-cyclopentane nitrile, 2,2'-azo-bis-2-cyclopropyl-propionitrile, 2,2'-azo-bis-2,3dimethylbutyronitrile, 2,2'-azo-bis-2-methylvaleronitrile, 2,2'-azo-bis-2-methylvaleronitrile, 2,2'-azo-bis-2-cyclobutyl-propionitrile, 1,1'-azo-bis-1-cyclohexane nitrile, 2,2'-azo-bis-2,3-trimethylbutyrontrile, 2,2'azo-bis-2,3,3-trimethylbutyronitrile, 2,2'-azo-bis-2-methylhexylnitrile, 2,2'-azo-bis-2,4-dimethylvaleronitrile, 2,2' -azo-bis-2,4-dimethyl-valerontrile, 2,2'-azo-bis-2-isopropyl-butyronitrile, 1,1'-azo-bis-1-cycloheptanenitrile, 2,2'-azo-bis-2-methylheptylnitrile, 1,1'-azo-bis-1-(2-methylcyclohexane)-nitrile, 1,1'-azobis-1-cyclohexanecarbonitrile,2,2'-azobis-2-cyclopentylpropionitrile, 2,2'-azo-bis-2,4,4-trimethyl-valeronitrile, 2,2'azo-bis-2-isopropyl-3-methylbutyronitrile,2-,2'-azo-bis-2-cyclohexylpropionitrile, 1,1'-azo-bis-1-cyclooctanenitrile, 1,1'-azo-bis-1-cyclooctane nitrile, 2,2'-azo-bis-2-benzyl-propionitrile, 2,2'-azo-bis-2-isobutyl-4-methylvaleronitrile, 2,2'-azo-bis-2-(4-chlorobenzyl)propionitrile, 2,2'-azo-bis-2-(4-nitrobenzyl)propionitrile, 1,1'-azo-bis-1-cyclodecane nitrile, t-butylazoformamide, triazobenzene, azo-bis-isobutyramidine, azo-bis-isobutyramidine 2HCl,azo-bis-isobutyramidine 2HNO₃, 2,2'-azo-bis-methyl-2-methylpropionate, 2-t-butylazo-2-methoxy-4-methylpentane, 2-t-butylazo-2,4-dimethylpentane, 1-t-butylazo-1 -methoxycyclohexane, azo-bis-(N,N'-dimethyleneisobutyramadine 2HNO₃, azo-bis-(N,N'-dimethyleneisobutyramadine),azo-bis-(1-carbomethoxy-3-methylpropane), 2-t-butylazo-2,4-dimethoxy-4methyl-pentane, 1,1'-azo-bis-1-phenylethane, 1-t-butylazo-1-phenylcyclohexane, 2-t-butylazo-2-thiophenoxy-4-methylpentane, 2-t-butylazo-2-[p-(t-butyl)-thiophenoxy]-propane, 3,7-diphenyl-1,2-diaza-1-cycloheptene, 1,1'-azo-bis-1-(4-methoxyphenyl)-ethane, 1,1'-azo-bis-1-phenylpropane, 1,1-azo-bis-1-(4-tolyl)ethane, azo cumene, phenyl-azo-diphenylmethane, 1,1'-azo-bis-1-phenyl-3-methylbutane, 2-t-butylazo-2-dodecylthio-4-methoxy-4-methylpentane, phenyl-azo-triphenylmethane, 3-bromophenyl-azo-triphenylmethane, 4-bromophenyl-azo-triphenylmethane, 4-hydroxyphenyl-azo-triphenylmethane, 2-nitrophenyl-azo-9-phenylfluorene, 4-nitrophenylazo-9-phenylfluorene, 2,4-dinitrophenyl-azo-9-phenylfluorene, 2-nitrophenylazo-triphenylmethane, 3-nitrophenyl-azo-triphenylmethane,4-nitrophenyl-azo-triphenylmethane, 2,4-dinitrophenyl-azo-tri-phenylmethane, azo-bis-diphenylmethane, 4-methoxyphenyl-azo-tri-phenylmethane, 3-toly-azo-triphenylmethane, 4-toly-azo-triphenylmethane, 4-acetaminiphenyl-azo-tri-phenylmethane, 3,10, 13,20-terephenyl-1,2,11,12-tetraaza-1,11cycloeicosadiene, 3,12,15,24-tetraphenyl-1,2,13,14-tetraaza-1,13-cyclotetracosadiene, 3,14,17,28-terephenyl1,2,15,16-tetraaza-1,15cyclooctacosadiene, p-methoxybenzene diazo thio-2-naphthylether. -cyclooctacosadiene, Mixtures of these and homologous and isomeric disazo and triazo compounds thereof can be employed as the azo initiator according to the invention. The well-known class of organic azo initiators is more completely described in the Encyclopedia of Polymer Science and Technology, Interscience Publishers, vol. 2, 1965, p. 278–295 and J. Brundrup and E. H. Immergut Editors, "Polymer Handbook," Interscience Publishers, 1965, Section II p. 1–14, the pertinent subject matter of which references is hereby incorporated by reference.

Organic azo initiators generally contain a diazo or triazo group terminally substituted with a hydrocarbon radical selected from the group consisting of alkyl, aryl, alkaryl, or aralkyl substituent which typically contain 1 to 25 carbon atoms. The hydrocarbon radical can be substituted with conventional substituents such as nitrile groups ester groups, e.g. carboxy - lower alkyl groups, ether groups, thioether groups, halogen, e.g. fluorine, chlorine and bromine, and the like. The other terminal position of the azo group can be substituted with a like or different hydrocarbon radical of the type described above which can be directly bonded to the nitrogen of the azo group or bonded thereto by an intervening sulfur or oxygen molecule. Alternatively the azo group maybe attached to a carbonyl group, e.g. a carbonamide group, a carbo - lower alkoxy substituent, or a carboxylate group, such as an alkali metal carboxylate substituent. Instead of the foregoing hydrocarbon substituted azo compounds, compounds wherein two of the aforementioned carbonyl substituents are attached to the ends of the azo group as in azo diformate esters e.g. diethyl azo diformate, or as in dicarbonamide. The azo initiator can also be a diazonium salt such as an aryl diazonium salt, e.g. benzene diazonium sulfate.

More than one azo group may be present in the molecule of the azo initiator. When an azo initiator contains two like or different hydrocarbon substituents as described above, the two hydrocarbon substituents may be joined together to form a cyclic system including the azo substituent. Preferably the organic azo initiator employed in the invention is an azo bis alkyl compound, i.e. an azo initiator containing one diazo group, (-N=N-) terminally substituted by alkyl or substituted alkyl radicals as defined above. Preferably an azo-bis-alkyl nitrile, especially an azobis-lower alkyl nitrile is employed as the azo initiator. An especially good result is generally obtained in the present process by employing an azo-bis-lower alkyl nitrile wherein both alkyl nitrile substituents are alike, as in 2,2'-azo-bis(2,4-dimethyl valeronitrile) and azo-bis-isobutyronitrile.

Advantageously the azo initiator which is used is chosen from the group of initiators known in the prior art as "hot catalysts", in other words, those which have a high degree of free-radical initiating activity. Azo initiators with a lower degree of activity, while useful, are less desirable in that they require a longer polymerization time at a given reaction temperature, which may be inconvenient. Also long polymerization times may cause preliminary product degradation evidenced by color problems, e.g. pinking.

The vinyl halide monomers included within the scope of the invention include, e.g., vinyl fluoride, vinyl chloride, vinyl bromide, vinyl iodide, vinylidene fluoride, viylidene chloride, vinylidene bromide, vinylidene iodide and the like, although vinyl chloride is preferred. It is intended to include within the scope of the invention alpha-halo-substituted ethylenically unsaturated materials and, thus, the invention is intended to cover homopolymers, copolymers, including terpolymers and tetrapolymers and graft copolymers formed by addition polymerization. Illustrative of these copolymers is a copolymer of vinyl chloride and vinylidene chloride. Illustrative graft copolymers are vinyl halide graft copolymers derived from vinyl halide - compatible back bone polymers such as ethylene propylene rubber, ethylene propylene diene modified rubber, ethylene-vinyl acetate copolymers, etc. The term "vinyl halide polymer" as used in this specification and claims is intended to include both homopolymers and copolymers of vinyl halide.

While it is preferred that the monomer composition be comprised totally of vinyl halide monomer as described above, the present invention is also intended to include copolymers formed by the free-radical addition polymerization of a monomer composition containing a predominant amount, e.g. at least 50% of vinyl halide and a minor amount e.g., up to 50% by weight of another ethylenically unsaturated monomer material copolymerized therewith. Preferably the other ethylenically unsaturated monomer material is used in amounts of less than 25% by weight and more preferably in amounts less than 10% by weight of the total monomer materials used in preparing the polymer. Suitable ethylenically unnsaturated monomer materials which can be used to form copolymers, terpolymers, interpolymers and the like, are illustrated by the following monoolefinic hydrocarbons, i.e., monomers containing only one carbon to carbon double bond, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives, e.g., o-, m- or p-methyl, ethyl, propyl or butyl styrene; alphamethyl, ethyl propyl or butyl styrene; phenyl styrene, and halogenated styrenes such as alphachlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alphachloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alphachloroacrylate, and ethyl alpha-chloroacrylate, methyl alphachloracrylate, and ethyl alpha-chloracrylate, methyl alpha-bromoacrylate, ethyl alphabromomo-acrylate, methyl alpha-fluoracrylate, ethyl alpha-fluoracrylate, methyl alpha-iodoacrylate and ethyl alpha-iodoacrylate; alkyl alphacyanoacrylates, e.g., methyl alpha-cyanoacrylate and ethyl alpha-cyanoacrylate and alkyl alpha-cyanoacrylates, e.g., methyl alpha-cyanoacrylate and ethyl alpha-cyanoacrylate; meleates, e.g., monomethyl maleate, monoethyl maleate, dimethyl maleate, diethyl maleate; and fumarates, e.g. monomethyl fumarate, mono-ethyl fumarate, dimethyl fumarate diethyl fumarate; and diethyl glutaconate; monolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride, and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl bethachloroethyl sulfide, vinyl beta-ethoxyethyl sulfide and the like can also be included. Diolefinically unsaturated hydrocarbons containing two olefinic groups in conjugated relation and the halogen derivatives thereof, e.g., butadiene-1,3; 2-methylbutadiene- 1,3; 2,3dimethylbutadiene-1,3; 2-methylbutadiene-1,3; 2,3-dimethyl-butadiene-1,3; 2-chlorobutadiene-1,3; 2,3-dichlorobutadiene-1,3; and bromobutadiene-1,3 and the like, are also suitable as ethylenically unsaturated monomers.

Specific monomer compositions for forming copolymers can be illustrated by vinyl chloride and vinylidene chloride, vinyl chloride and vinyl acetate, vinyl chloride and vinylidene chloride and/or maleic or fumaric acid esters, vinyl chloride and vinyl chloride and vinylidene chloride and/or acrylate or methacrylate esters, vinyl chloride, vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

The added monomer or monomers can be the same or different than the vinyl halide polymer and, where different, the monomer or monomers are preferably selected from those classes of monomers which polymerize at the same or a faster rate in a theoretical bulk polymerization process as compared to said vinyl halide polymer. Up to 50% of a comonomer can be used. Examples of monomers useful in the polymerization process of the invention are vinyl chloride, methyl acrylate, 2-ethyl hexyl acrylate, 2-hydroxyethyl acrylate, acrylic acid, stearyl methacrylate, methacrylic acid, methyl methacrylate and n-butylacrylate.

The present process can be used to obtain low molecular weight vinyl halide polymers at polymerization temperatures ranging from about −60° to about 90°C. Preferably the polymerization in the presence of organo tin mercaptide ester and azo initiator according to the invention is effected at about 30° to about 70°, especially at about 40° to about 65°C.

In the liquid phase bulk polymerization method of the invention, all other conditions and measures are those conventionally employed in the previously known processes for bulk polymerization of vinyl chloride comprising a two-stage polymerization as disclosed in the aforementioned British Patent No. 1,047,489 and U.S. Pat. No. 3,522,227. In an integrated polymerization process of the invention employing the preferred two-stage bulk polymerization process for vinyl halide, wherein the present improvement is carried out in the second stage, the reaction is conducted in a first stage reactor with means chosen to agitate the monomer or monomers or a type capable of providing high sheer and commonly referred to as a "radial turbine type" agitator. At the start of the first stage reaction, the vessel is charged with a monomer composition to which an initiator has been added. Any polymerization initiator generally used in bulk vinyl halide polymerization methods, that is any of those azo initiators hereinabove described as well conventional organic peroxy initiators such as benzoyl peroxide, diacetylperoxide, dispropyl peroxydicarbonate, t-butyl peroxypivalate, acetyl cyclohexane sulfonyl peroxide, di-(2-ethyl hexyl) peroxydicarbonate, caprylyl peroxide and the like can be employed to an extent which is usual for bulk polymerization processes.

After addition of the vinyl chloride monomer to the first stage reactor, a small amount of monomer is vented in the process of removing the air from the first stage reactor vessel. The speed of the turbine type agitator generally lies between 500 and 2,000 revolutions per minute or a tip speed of about 2 to 7 meters per second in the first stage reactor. A tip speed of about 0.5 to about 2 meters per second is used in the second stage reactor, the contents of the vessel are transferred to a second stage polymerization vessel which is equipped to provide slow speed, low shear agitation so as to insure proper temperature control of the reaction medium and which contains, the molecular weight lowering agent and azo initiator of the invention and advantageously additional monomer. Generally the polymerization in the second stage is completed when about 30 to 85% or more by weight of the reaction mixture has been converted to polymer. As is conventional in this art the polymer is recovered from unreacted monomer by venting the latter from the reaction vessel.

The polymerization products of the present invention can be admixed with various conventional inert additives, such as fillers, dyes, and pigments. In addition, the polymerization products can be admixed with conventional plasticizers, lubricants, thermostabilizers, anti-oxidants, and ultraviolet light stabilzers as desired.

The aforementioned inert additives and conventional stabilizers and adjuvants are added to the polymer according to known processing techniques. Because of their lower molecular weights the present polymers (as compared to corresponding polymers of higher molucular weight prepared at the same temperature in absence of the present molecular weight regulating agent) have substantially lower melt viscosities and hence are more easily processed, e.g., fused, extruded, molded, etc., in conventional processing equipment without requiring use of extreme temperatures which would have a detrimental effect on polymer strength and color. The excellent fusion and extrusion characteristics of the present polymers make them particularly suitable for flexible packaging extrusion applications, injection and blow molding the manufacture of flexible bottles, and a fusion powder applications, e.g., powder static fusion processes such as fluidized bed coating; roto-casting electrostatic deposition and powder flow coating.

The invention is particularly advantageous in that it accomplishes molecular weight reduction without the use of halogenated hydrocarbons, mercaptans or other volatile molecular weight lowering agents which produce noxious odor or frequently, in addition, toxicity problems in the work area environment.

As compared to corresponding vinyl halide polymers of about the same molecular weight as those of the invention, which are prepared by high temperature molecular weight lowering processes, the present polymers are faster fusing and have lower melt viscosities enabling the present products to be processed in fusion applications more efficiently and at lower temperatures.

In order to further illustrate this invention but without being limited thereto, the following examples are given. In this specification, all parts, percentages and proportions are by weight and all temperatures are in degrees centigrade unless otherwise specified.

EXAMPLE 1 (Control)

A polyvinyl chloride homopolymer is prepared in a two-stage, bulk polymerization process by adding to an ice-water cooled one-liter stainless steel reactor, 0.12 g. of Lupersol 228-P (29% solution of acetyl cyclohexane sulfonyl peroxide in dimethyl phthalate manufactured by Lucidol Div. of Pennwalt Corp.) and 0.1 g. of 2,2-azo-bis(2,4-dimethyl valeronitrile). The reactor is pressurized with nitrogen to test for leaks and placed under vacuum. Subsequently 500 g. of vinyl chloride is introduced, following which 50 g. of the vinyl chloride are vented to the atmosphere to remove entrapped air. The reaction mass is heated at 70° under a pressure of about 150 p.s.i.g. while being agitated with a turbine agitator operating at about 1500 revolutions per minute. After 20 minutes the agitation speed is reduced to about 300 revolutions per minute and the reaction mass, wherein about 7 to 12 percent of the vinyl chloride has polymerized, is flowed under pressure to a two-liter glass reactor containing a mixture of 300 g. of vinyl chloride and about 0.8 g (0.114%) of azo-bis(2,4-dimethyl(valeronitrile) which is agitated with an interrupted screw stirrer operating at about 235 revolutions per minute. After a 50 g. portion of the vinyl chloride is removed by venting, the stirred reaction mass is heated at 65° for 6 hours at under a pressure of 130 p.s.i.g. The particulate solid polyvinyl chloride product is recovered by venting the unreacted vinyl chloride monomer in the reaction vessel to the atmosphere. There is thus obtained 522 g. of polyvinyl chloride (74% yield) having a number average molecular weight of 25,100 and weight average molecular weight of 71,600.

EXAMPLES 2-5

The procedure of Example 1 is repeated in Examples 2-5 substantially as described except varying amounts of diffenent organotin mercaptide esters are added to the second stage reactor along with the 0.8 g. of azobis(2,4-dimethyl valeronitrile) and 300 g. of vinyl chloride before the beginning of the second state polymerization. These examples are summarized and compared with the results of Example 1 in Table 1 below.

EXAMPLE 8

The procedure of Example 1 is repeated substantially as described except that to the first reaction stage there is added 0.1 g. of the zero initiator and 550 g. of vinyl chloride with 50 g. of vinyl chloride being vented from the reactor and that to the second stage reactor there is added 1.0 g. (0.13%) of the azo initiator and 2.0 grams (0.27%) for the organotin mercaptide ester molecular weight lowering agent of Example 2 with the reaction

TABLE I

| Example | Organotin Mercaptide Ester Added | % Organotin Mercaptide Ester Added Based on Weight of Polymerization Mass | Yield Of Polymer | Number Average Molecular Weight of Polymer | Weight Average Molecular Weight of Polymer |
| --- | --- | --- | --- | --- | --- |
| 1 (Control) | none | 0 | 74 | 25,100 | 71,600 |
| 2 | di-n-butyl tin S,S'-bis (isooctylmercaptoacetate) | 0.57 | 56 | 22,000 | 52,800 |
| 3 | as in Example 2 | 1.0 | 45 | 15,400 | 40,600 |
| 4 | di-n-octyl tin-S,S'-bis (isooctylmercaptoacetate) | 0.57 | 53 | 17,700 | 48,100 |
| 5 | as in Example 4 | 1.0 | 50 | 15,100 | 41,800 |

Note:
Di-n-butyl tin S,S'-bis(isooctylmercaptoacetate) and di-n-octyl tin S,S'-bis-(isooctylmercaptoacetate) are available as Thermolite 31 and Thermolite 831, respectively, manufactured by M and T Chemicals Inc.

From comparison of the results of Examples 2-5 with those of the control Example 1, it is apparent that use of the organotin mercaptoester according to the invention effectively lowers the molecular weight of the polymer products in Examples 2-5.

The following example 6 illustrates the copolymerization of vinyl chloride with methyl acrylate in accordance with the invention.

EXAMPLE 6

The procedure of Example 1 is repeated substantially as described except that a net amount of 200 g. of vinyl chloride and 7 g. (0.97% based on weight polymerization reaction mass of di-n-butyl tin-S,S'-bis(isooctyl mercaptoacetate) is charged at the beginning of the second stage reaction and that, after the reaction in the second stage has proceeded for 3 hours, 75 g. of methyl acrylate is introduced into the second stage reaction mixture which is then heated at 65° and 130 psi an additional three hours. An excellent low molecular weight copolymer (404 g. corresponding to a yield of 56%) of vinyl chloride and methyl acrylate is obtained.

EXAMPLE 7

The procedure of Example 2 is repeated except that in the first reaction stage the azo initiator is replaced by 0.214 g. of Lupersol 223-M peroxide initiator (a 40% solution of di-[2-ethyl hexyl]-peroxydicarbonate in mineral spirits manufactured by Lucidol Division of Pennwalt Corp.) and at the beginning of the second reaction stage there is added 7 g. (1% based on the weight of the polymerization reaction mixture) of the organotin mercaptide ester of Example 2 and a mixture of 0.97 g. (0.14%) of Lupersol 228-P peroxide initiator and 1.7 g. (0.24%) Lupersol 223-M peroxide initiator place of the azo initiator. There is obtained only about 30 g. (4.29% yield) of polyvinyl chloride.

Comparison of the results of this example with those of Examples 2-5 indicate that use of an organic peroxide initiator instead of an organic azo initiator in conjunction with the present organotin mercaptide ester molecular weight lowering agent provides substantially no yield of polyvinyl halide, i.e. a yield of polymer of less than 5%.

temperature and pressure in the second stage being about 60° and about 110 to 143 p.s.i., respectively. There is obtained 604 g. (80.6% yield) of polyvinyl chloride product having a number of average molecular weight of 27,429 and a weight average molecular weight of 70,072.

EXAMPLE 9

The procedure of Example 8 is repeated substantially as described except that the second stage reaction is carried out in the presence of 4 g. (0.54%) of the organotin mercaptide ester molecular weight lowering agent. There is obtained 441 g. (58.8% yield) of polyvinyl chloride product having a number average molecular weight of 21,090 and a weight average molecular weight of 57,572.

Comparison of the results of Examples 8 and 9 indicates that at the same reaction temperature doubling the concentration of the organotin mercaptide ester molecular weight regulator in the vinyl halide polymerization lowers the number average polymer molecular weight by 6,339 (23.1%) and the weight average polymer molecular weight by 12,500 (16.7%). Hence at a given polymerization temperature the molecular weight lowering effect of the organotin mercaptide ester in the polymerization increases with increasing concentration of the organotin mercaptide ester in the polymerization reaction mass so that at a given temperature the polymer molecular weight can be readily regulated by adjusting the concentration of the organotin compound in the reaction mass.

EXAMPLE 10 (Control)

A polyvinyl halide polymer of molecular weight substantially similar to that of Example 8 is prepared by a two-stage polymerization process substantially similar to that of Example 8 except that the second reaction stage is maintained at 71° (and at a corresponding higher reaction pressure of 196.7 p.s.i.g.) to effect molecular weight reduction of the polymer and the organotin mercaptide ester reagent is omitted. In order to prevent a runawya, i.e., an excessively violent, reaction at the aforesaid elevated temperature, the azo initiator of Example 8 is replaced in this experiment with 0.0412% of Lupersol 228-p and 0.0486% of lauryl peroxide which have a substantially lower initiating activity than the 2,2'-azo-bis(2,4-dimethyl valeronitrile) charged as initiator in Example 8. A sample of the polyvinyl halide product and a sample of the Example 8 product which are stabilized against oxidation by incorporation of 1 part per hundred parts of polymer of Thermolite 187 (a proprietary triaryl phosphite chelator manufactured by M and T Chemicals Inc.) and against thermal decomposition by incorporation of about 2 parts per hundred parts of polymer of the organotin mercaptide ester of Example 2 into the polymer products are comparatively tested in a Brabender Plastograph set at 204° and 63 r.p.m. to determine fusion time, and melt equilibrium torque. The results of this example are compared with corresponding results of Example 8 in the Table II below.

In Table II comparison of the fusion times indicate that low molecular weight polyvinyl halide obtained by the present molecular weight lowering method is substantially faster fusing than the corresponding polyvinyl haldie of substantially similar low molecular weight prepared by the conventional elevated temperature molecular weight lowering procedure. The melt equilibrium torque of the product of the present invention is also lower than that of the low molecular weight polyvinyl halide prepared by use of elevated temperature. The latter result indicates low molecular weight polyvinyl halide prepared in accordance with the present invention has a substantially lower melt viscosity than a corresponding polyvinyl halide of similar low molecule weight prepared by an elevated temperature-molecular weight regulation method at a polymerization temperature 11° above the polymerization temperature employed in preparing the polymer of the invention.

While the invention has been described with reference to certain specific embodiments, it will be recognized that many variations are possible without departing from the scope and spirit of the invention.

consisting of alkyl, aryl, alkaryl, and aralkyl radicals, and R' is a divalent organic radical selected from the group consisting of alkylene and aralkylene radicals, with the polymerization being carried out in the presence of an effectively amount of organic azo initiator whereby the polymerization is effetively initiated, said organotin mercaptide ester being added to the polymerization reaction when 0 to no more than about 15 weight percent of said monomer or monomers is converted to polymer, said polymerization being continued in the presence of said organo-tin mercaptide ester to obtain the vinyl halide polymer product in a conversion of at least about 30 weight percent, whereby the molecular weight of the vinyl halide polymer product is substantially lower than the molecular weight of the corresponding polymer obtained by polymerization in the absence of said mercaptide ester.

2. The process as claimed in claim 1 wherein the vinyl halide is vinyl chloride, the R, R', and R'' groups of the organotin mercaptide ester are saturated aliphatic radicals of 1 to 20 carbon atoms, $n$ is 2 and the concentration of the mercaptide is about 0.01 to 5 weight percent of the polymerization mass, the entire polymerization being carried out in the presence of said mercaptide ester, and said initiator.

3. The process as claimed in claim 2 wherein the vinyl chloride polymer is a homopolymer, the polymerization temperature is about 30 – 70°C and the azo initiator is an azo bis-alkyl compound introduced in a concentration of about 0.05 to 2 percent based on the weight of the polymerization mass.

4. The process as claimed in claim 3 wherein the polymerization is a bulk polymerization of vinyl chloride, R and R'' of the organotin mercaptide ester contain 1 to 12 carbon atoms, R' is a lower alkylene radical and the azo-bis-alkyl initiator is an azo-bis-lower alkyl nitrile.

5. The process as claimed in claim 4 wherein the polymerization temperature is about 40° to 65°C, the

TABLE II

| Polyvinyl Halide | Weight Average Molecular Weight | Number Average Molecular Weight | Fusion Time (seconds) | Melt Equilibrium Torque (meter-gram) |
|---|---|---|---|---|
| Example 8 | 70,072 | 27,429 | 8 | 750 |
| Example 10 (Control) | 71,800 | 25,800 | 22 | 860 |

What is claimed is:

1. In the bulk process for preparation of a vinyl halide homopolymer, vinyl halide copolymer or vinyl halide graft polymer containing up to about 50% by weight of comonomer and/or a compatible back-bone polymer which comprises
    1. polymerizing in liquid phase vinyl halide monomer or vinyl halide monomer in the presence of up to about 50% by weight of said comonomer and/or said back-bone polymer,
    2. recovering vinyl halide power from said monomer or monomers, the improvement which comprises carrying out at least part of the polymerization in the presence of a molecular weight-lowering amount of an organotin mercaptide ester of the formula:

wherein $n$ is an integer 1 to 3, R and R'' are univalent organic radicals selected independently from the group concentration of organotin mercaptide is about 0.1 to 2 percent by weight and the azo-bis-alkyl nitrile is employed at a concentration of about 0.1 to 1 percent by weight.

6. The process as claimed in claim 5 wherein the concentration of the mercaptide ester is about 0.1 to 2 percent by weight, the sulfur atoms of the organotin mercaptide ester are attached to R' at the carbon atom of R' which is adjacent to the ester carbonyl group and the azo initiator is an azo-bis-lower alkyl nitrile wherein both lower alkyl nitrile groups are alike.

7. The process as claimed in claim 6 wherein the R' substituent of the mercaptide ester is methylene and the azo initiator is 2,2-azo-bis(2,4-dimethyl-valeronitrile).

8. The process as claimed in claim 7 wherein the mercaptide ester is di-n-butyl tin S,S'-bis(isooctyl mercaptoacetate).

9. The process as claimed in claim 7 wherein the mercaptide ester is di-n-octyl tin S,S'-bis-(isooctyl mercaptoacetate).

10. The process as claimed in claim 1 wherein the polymerization is a bulk polymerization in two stages, wherein the first stage reaction mixture is subjected to high speed agitation until about 3 percent to about 15 percent of said monomer or monomers have been converted to polymer and wherein the resultant reaction mixture is subjected to low speed agitation in the second stage until the polymerization has been completed, said second stage reaction being carried out in the presence of the organotin mercaptide ester and of the azo initiator.

11. The process as claimed in claim 10 wherein the vinyl halide polymer is a vinyl chloride homopolymer.

12. A two-stage liquid bulk process for the preparation of a low molecular weight polyvinyl chloride wherein said bulk polymerization comprises the steps of:
 1. polymerizing in the first stage vinyl chloride or vinyl chloride in the presence of up to 50% by weight of a comonomer while subjecting the reaction mixture to high speed agitation until about 3 weight percent to about 15 weight percent of said monomer or monomers have polymerized,
 2. subjecting the resultant reaction mixture to low speed agitation in the second stage to complete polymerization in the presence of a molecular weight lowering amount of organotin mercaptide ester of the formula:

wherein $n$ is an integer 1 to 3, R and R'' are univalent organic radicals selected independently from the group consisting of alkyl, alkaryl, and aralkyl radicals and R' is a divalent organic radical selected from the group consisting of alkylene and aralkylene radicals, and of an initiating amount or an organic azo initiator, said organotin mercaptide ester being present at the beginning of said second stage reaction and said polymerization being continued in the presence of said organotin mercaptide ester to obtain the vinyl halide polymer product in a conversion of at least about 30 weight percent.
 3. recovering said polymer from unreacted monomer or monomers, whereby polymerization is effectively initiated and the vinyl chloride polymer product is of lower molecular weight than the corresponding polymer obtained by polymerization in absence of said mercaptide ester and said initiator.

13. A polymeric product prepared by the process as claimed in claim 1.

* * * * *